April 12, 1966  N. C. AMEN  3,245,323
PRESSURE RESPONSIVE LOAD APPLYING MEANS
Filed Oct. 22, 1963  2 Sheets-Sheet 1
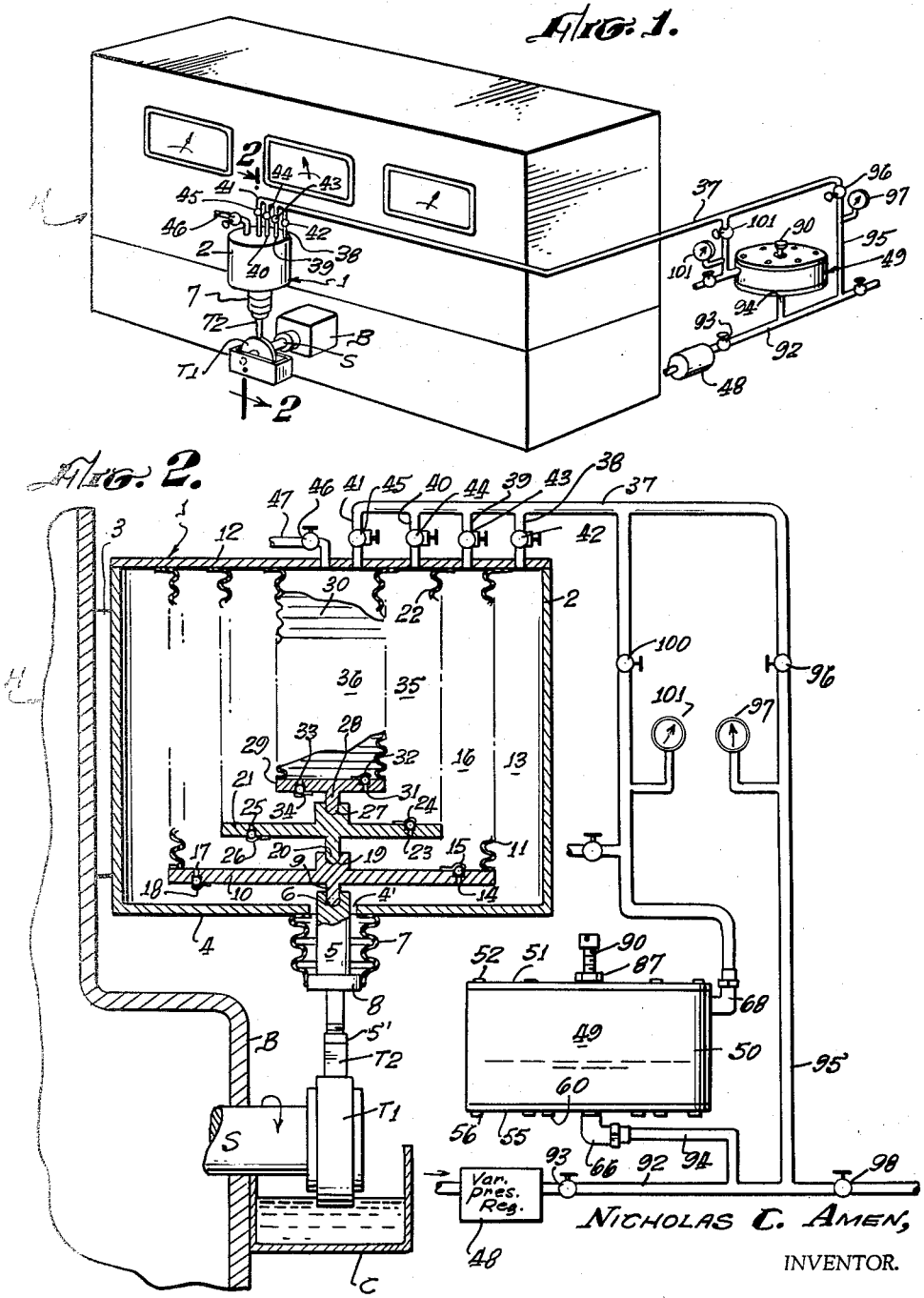
NICHOLAS C. AMEN,
INVENTOR.
BY Arnold J. LeVesconte
ATTORNEY.

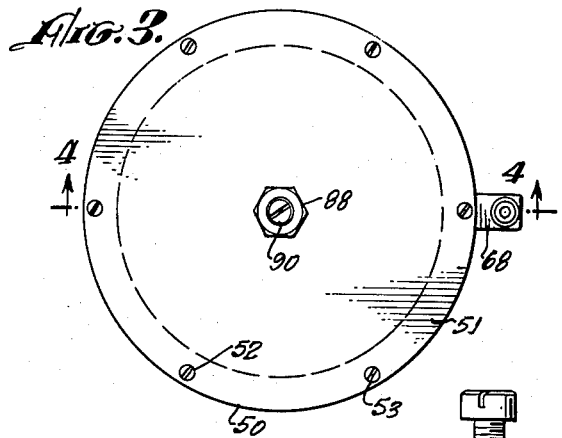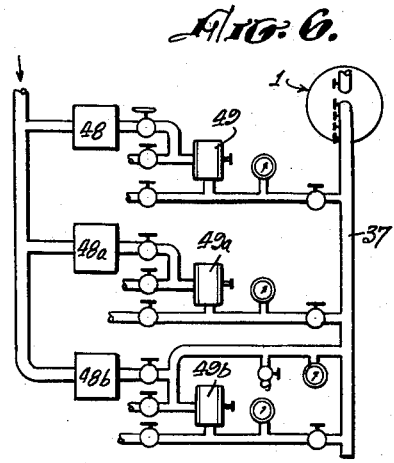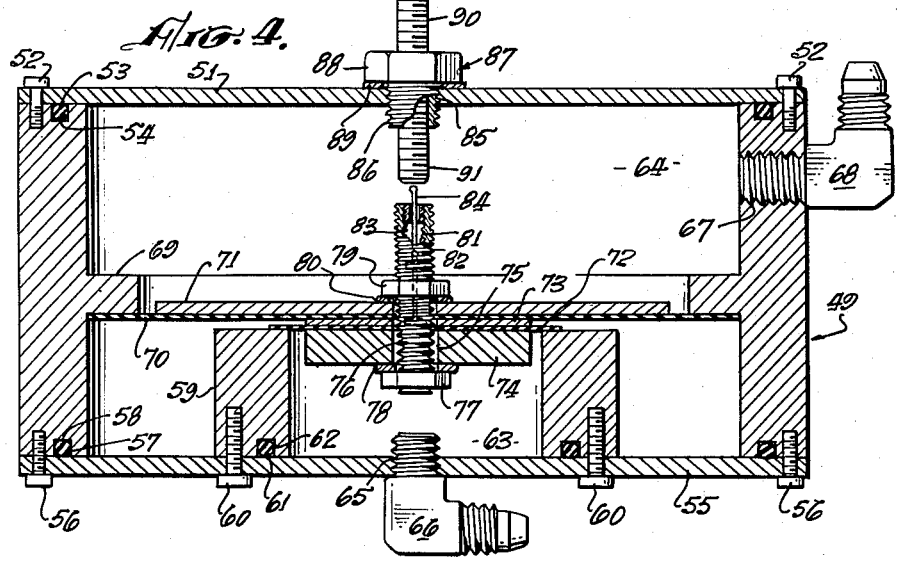

United States Patent Office 3,245,323
Patented Apr. 12, 1966

1

3,245,323
PRESSURE RESPONSIVE LOAD APPLYING MEANS
Nicholas C. Amen, 318 W. Colorado St.,
Glendale, Calif.
Filed Oct. 22, 1963, Ser. No. 317,962
10 Claims. (Cl. 91—414)

This invention relates to fluid pressure responsive apparatus and more particularly to an expansible chamber means for accurately imposing a pressure induced load on an element of mechanism characterized by a minimum of inertial or hysteresis losses while having the capacity to impose a wide range of loads on the element of mechanism to be affected by such imposed loads.

In my Patent No. 2,780,091, dated February 5, 1957, there is described and claimed a bearing and friction evaluating apparatus. The said apparatus is capable of evaluating bearing engagement of various surfaces under different conditions of load, lubricants, surface speed, temperature, etc. The bearing load in the said apparatus was supplied by a hydraulic cylinder and piston means having a compressed air containing dome portion above the fluid whereby a yielding load was applied to the test element to accommodate irregularities or eccentricities in the surface being subjected to tests. Experience with the said patented device disclosed the possibility that it might be made more sensitive by the reduction of the weight of the parts which carried the test bar element and applied the friction producing load thereon and the principal object of the present invention is to provide a pressure responsive device including expansible chamber means which is subject to elastic fluid pressure and which is characterized by the capacity to vary the load applied to a test bar subjected to pressure against a rotating surface of another test element of the said bearing and friction evaluating device forming the subject matter of my said prior patent.

Another object of the invention is to provide a means whereby the pneumatic pressures applied by the said device can be determined with extreme accuracy to the end that the actual load of the test bar against the rotating surface of a pair of elements to be tested can be accurately imposed.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification, and in which drawings:

FIG. 1 is a semi-diagrammatic perspective view of the friction evaluating apparatus forming the subject matter of my said prior patent and showing the bearing load applying means of the present invention substituted for that shown in my said prior patent, FIG. 2 is a greatly enlarged medial sectional side elevational view of the pressure applying means of the present invention, the section being taken on the line 2—2 of FIG. 1 and showing additionally schematically the compressed air conducting system and the pressure proportioning valve component of the present invention, FIG. 3 is an enlarged top plan view of the pressure proportioning means, FIG. 4 is a further enlarged medial sectional side elevational view taken on the line 4—4 of FIG. 3 of the said pressure proportioning means shown in FIG. 2, FIG. 5 is a bottom plan view of the pressure proportioning means, and FIG. 6 is a diagrammatic illustration of the use of a plurality of the pressure proportioning device of different input and output pressure ratios.

2

Referring to the drawings, FIGS. 1 and 2 show the device of my said prior patent comprising a case or housing H having a bearing boss B projecting from the lower front face thereof and through which a shaft S extends for detachable mounting of the test ring or element T1; said ring contacting a body of lubricant carried by a container C. The stationary test bar T2 is carried by and is yieldingly pressed against the test ring under a predetermined load imposed by the pressure responsive load applying unit 1 of the present invention.

The unit 1 includes a generally cylindrical or tubular hollow body 2 attached to the front face of the housing H by bracket means 3 with the axial line of said body extending diametrically centrally of the test ring T1. The test bar T2 is guided for right line movement in the axial line of the body 2 by means not shown and for which any suitable guiding means capable of resisting side thrust on the test bar deriving from frictional engagement with the rotating ring may be employed; the means shown in the said prior patent being one example of such guiding means.

The cylindrical body 2 of the unit 1 is closed by an end wall 4 having an axial opening 4′ in the side thereof adjacent the shaft 5 and is closed at the opposite end by an end wall 12 provided with certain connections for the admission and exhaust of air therefrom to which further reference will be made. Reciprocable through the opening 4′ is a rod 5 which at the end thereof disposed exteriorly of the body 2 carries abutment means 5′ for the end of the test bar T2 which is remote from the test ring T1. At the end of the bar 5 within the body 2, it is provided with a socket 6 disposed in the axial line of the body 2. A heavy metal bellows 7 surrounds the portion of the bar 5 which projects beyond the bottom of the body 1 and has one end thereof attached to the under side of the bottom surface of the body 1 and the other end thereof attached to an annular flange 8 surrounding the outer end of the rod 5 thus serving to afford a pressure tight seal between the rod and the housing, to permit reciprocable movement of the rod, and to hold said rod centered in the axial line of the body 2 and out of contact with the perimeter of the opening 4′.

The end of the rod 5 is provided with a socket 6 and is disposed within the body 2 slightly inwardly of the end wall 4 and the socket 6 is engaged by the end of a stud member 9 projecting from the center of a first plate-like end member 10 which is disposed parallel to and spaced from the end wall 4 of the body 2 and which has a diameter which is somewhat less than the inner diameter of said body. The periphery of the end member 10 is disposed in concentric relation to the body 2 and is connected by a bellows 11 to the inner face of the end wall 12 which closes the opposite end of the body 2, thereby forming an annular chamber 13 bounded by the body end members 4 and 12, the side wall 2′ of the body and the exterior of the bellows 11 together with the exterior surface of the rod 5 and the interior of the bellows 7. The end member 10 is provided with a port 14 extending therethrough which is normally closed by a spring biased valve 15 adapted upon being subjected to a predetermined pressure differential to allow air to pass through said port out of the chamber 13 into the nested chamber 16 at the opposite side of the end member 10. The end member 10 is further provided with a second port 17 extending therethrough and said port 17 is normally closed by a spring biased valve 18 adapted, upon being subjected to a predetermined pressure differential of a greater magnitude than that to which the valve 15 responds, is operative to allow compressed air, under certain conditions to flow from the chamber 16 to the chamber 13.

The end member 10 is provided on the upper face thereof with the centrally disposed socket 19 which is engaged by the depending stud 20 from a second and smaller end member 21 disposed parallel to and spaced from the end member 10 and having its perimeter connected by a bellows 22 to the end member 12 of the body member 2 said bellows being disposed concentrically with the bellows 11 cooperating with the bellows 11 and the end members 10 and 21 as well as the portion of the inner area of the end member 12 between the bellows members 11 and 22 to define the chamber 16.

The end member 21 is provided with a port 23 normally closed by a spring biased valve 24 generally corresponding to the valve 15 and the end member 21 is further provided with a port 25 normally closed by a spring biased valve 26 generally corresponding to the port 17 and valve 18. The central face of the end member 21 opposite the face carrying the stud 20 is provided with a socket portion 27 which is engaged by the centrally disposed stud 28 of a third end member 29 which is smaller in diameter than the end member 21 and the perimeter of which is connected to the member 12 by a bellows 30 disposed concentrically within the bellows 22. The end member 29 is provided with a port 31 normally closed by a spring biased valve 32 generally corresponding to the port 23 and valve 24 in the end member 21. The plate 29 is further provided with a port 33 normally closed by a spring biased valve 34 which generally corresponds to the port 25 and valve 26 in the end member 21.

The area of the body end member 12 between the bellows members 22 and 30, the inner face of the bellows 22, the outer face of the bellows 30 and the opposed faces of the end members 21 and 29 define a chamber 35 and the inner surface of the bellows 30 together with the opposing faces of the end member 29 and the end member 12 defines a chamber 36.

Compressed air is supplied selectively to the chambers 13, 16, 35 and 36 from a manifold 37 having branches 38, 39, 40 and 41 controlled by valves 42, 43, 44 and 45 serving respectively, the chambers 13, 16, 35 and 36 and the chamber 36 is further provided with a blow-off port 46 controlled by a valve 47. Compressed air at different pressures is selectively supplied through the manifold 37 from a source including a variable pressure regulator 48, and a pressure proportioning valve means 49 to be hereinafter described in detail and certain gauges and control valves also later to be discussed in detail.

For the moment, it will be sufficient to assume that desired pressures can be introduced into the manifold 37 and thence through selected ones of the valves 42, 43, 44 and 45 into the unit 1. While certain pressures, areas and pressure differentials will be assumed in the description of the operation of the device when subjected to pressures, it will be understood that this is merely by way of example for the sake of explaining the mode of operation of the device. With this in mind, let it be assumed that the end member 29 has a pressure responsive area of 1 sq. in., the end member 21, an area of 2 sq. in. and the end member 10, an area of 4 sq. in. Let it be assumed also that the various bellows 11, 22 and 30 are such as can withstand a pressure differential between their inner and outer surfaces of, say, 50 p.s.i. without permanent distortion. Assume further that the valves 15, 24 and 32 open at the lowest practicable pressure differential which, for the present description of operation of the device will be assumed to be substantially zero. Assuming next that a pressure of 300 p.s.i. is introduced through the conduit 38 and valve 42 into the chamber 13, the other valves being closed, the air so introduced will pass through the valves 15, 24 and 32 and fill the chambers 16, 35 and 36 as well as the chamber 13. Since the pressure in these chambers is equal and the opposite faces of the end members 10, 21 and 29 exposed to this pressure are equal, the effect will be that the 300 p.s.i. will be exerted on the end and exposed portions of the rod 5 which for present purposes may be assumed to be 1 sq. in. whereby a pressure of 300 lbs. is exerted by the device. Next assume that the supply means for the manifold 37 is readjusted and that a pressure of 325 p.s.i. is introduced through the conduit 39 and valve 43 into chamber 16, it being assumed that the other conduits and valves remain closed while any one of these conduits and valves is employed. As a result of this increased pressure, a pressure differential of 25 p.s.i. will be imposed on the end member 10 and since the bellows 11 is capable of withstanding a pressure differential of 50 p.s.i., it will not be affected by the fact that there is a pressure differential of only 25 p.s.i. on the opposite sides thereof. The pressure of 325 p.s.i. will, of course, pass through the valves 24 and 32 into the chamber 35 and 36 wherefore the pressure will be equalized on the end members 21 and 29. Since the end member presents an area of 4 sq. in., the said pressure differential will impose an additional 100 lbs. of pressure induced load and it is imposed on the rod 5 with very little hysteresis loss through the slight extension of the bellows 11. Supposing that a still further loading on the test member 2 is desired, assume that a pressure of 350 p.s.i. is introduced through the manifold, conduit 40 and valve 44 into chamber 35. This pressure differential of 25 p.s.i. will impose an added pressure induced load of 50 lbs. on the end member 21 to the loading on the test bar T2. The pressure, of course, will have been equalized on opposite sides of the end member 29. If further pressure is desired, particularly in very small increments, further pressure can be introduced through the manifold 37, conduit 41 and valve 45 into the chamber 36 wherein each pound of pressure differential above 350 p.s.i. thus introduced exerts an additional one pound of loading on the test bar T2. In every case, it is to be noted that the bellows elements are protected by having pressures within the limits which they are to withstand introduced on opposite sides thereof. To further protect these bellows elements, the relief valves 18, 26 and 34 are adjusted to yield at or slightly above the pressure differential established as a safety factor to protect these bellows. In the present instance that differential would be, say, 50 p.s.i. Thus, if the pressure in the chamber 36 was more than 50 p.s.i. over that in the chamber 35, the pressure would equalize itself to that differential in the two chambers through the relief valve 34.

After a test has been performed, with all of the manifold valves closed, the exhaust valve 47 can be opened and the interior of the entire device will "blow off" to atmospheric pressure. Thus it is that the load imposed on the test bar can be accurately varied by a device which is subject to elastic fluid pressure and which is subject to infinitesimal friction and hysteresis losses, it being noted that under the conditions and the nature of the construction, none of the bellows elements is expected or intended to be extended longitudinally in the response to pressure more than a very small fraction of an inch.

Next considering FIGS. 3, 4 and 5, there is shown a pressure proportioning means effective to deliver an output of compressed air at a pressure which is a predetermined fractional part of the input pressure. Gauges for measuring fluid pressure are dependent upon the effect of the applied pressure on a resilient component of the gauge, i.e., a Bourdon Tube or an expansible bellows. Gauges for lower ranges of pressures may be checked against a device such as a mercury filled manometer for absolute accuracy but such checking is not possible for gauges adapted for indicating higher ranges of pressures and, so far as is known, no manufacturer of such gauges for the higher ranges of pressure will guarantee accuracy of less than, say, ten percent plus or minus and, consequently, such gauges are totally unsuited for use with the friction evaluating device with which the present invention is intended to be used since that use requires that even high pressures be known accurately within a fraction of a percent. If these pressures are not accurately known, the friction evaluation on the testing device has no validity.

While, for convenience in illustration, the pressure proportioning means to be described is shown as having an output pressure which is one-fifth of the inlet pressure, in actual practice, other ratios, e.g., 1:10 or greater may also be employed and as will be hereinafter shown a group of such pressure proportioning means of different ratios may be connected in parallel for optional use.

The illustrated embodiment of the pressure proportioning means shown in FIGS. 3, 4 and 5 comprises a generally cylindrical body 50 closed at one end by an end plate 51 secured by screws 52 and sealed by a resilient gasket 53 disposed in a groove 54 in the end surface of the body 50. The opposite end of the body is similarly closed by an end plate 55 secured by screws 56 and having an interposed gasket 57 disposed in a groove 58 in the end of the body 50. The inner face of the end plate 55 carries a hollow, cylindrical member 59 secured thereto by screws 60 with an interposed gasket 61 disposed in a groove 62 in the end of said member 59; said cylindrical member 59 being disposed in concentric relation to the body 50.

The interior of the member 59 in association with the end plate 55 and certain pressure responsive means presently to be described, defines a high pressure chamber 63 and the portion of the body 50 and the end plate 51 together with said pressure responsive means defines a low pressure chamber 64. The chamber 63 is served by an inlet port 65 in the end plate 55 here shown as provided with an elbow fitting 66 and the low pressure chamber 64 is served by an outlet port 67 in the wall of the body 50 and here shown as provided with an elbow fitting 68.

At about its midlength, the inner surface of the body 50 is provided with an annular rib portion 69 and fixed to the side of said rib facing the end plate 55 is the edge of a flexible diaphragm 70 cemented or otherwise secured thereto and combining with the inner wall surface of the body member 50 and the end plate 59 to define the low pressure chamber 64. A back-up plate 71 is adhered to the side of said diaphragm which is exposed to the chamber 74, said plate being only slightly less in diameter than the inner diameter of the rib 69 and being uniformly spaced therefrom.

The end of the cylindrical member 59 which is remote from the end plate 55 is spaced a short distance from the side of the diaphragm 70 opposite the side which carries the plate 71 and the periphery of a smaller diaphragm 72 is adhered to said remote end and combines with the inner wall of the cylindrical member 59 and the end plate 55 to define the high pressure chamber 63. An intermediate plate 73 is interposed between and is adhered to the diaphragms 70 and 72 and an outer plate 74 is adhered to the side of the diaphragm 72 facing the chamber 63; the periphery of said outer plate being uniformly spaced from the inner wall of the cylindrical member 59. At this point it should be noted that the two diaphragms and the associated plates form a unit which is capable of slight movement axially of the body 50 by reason of the portions of the diaphragms which bridge the annular spaces between the plate 70 and the rib 69 and the plate 71 and the cylindrical member 59.

An axially disposed bore 75 extends through this diaphragm unit and an externally threaded valve supporting member 76 is secured therein by a nut 77 and a gasket 78 engaging the plate 74 and a nut 79 and gasket 80 engaging the plate 70. The valve supporting member 76 has an axial bore 81 extending therethrough and one end of the valve supporting member projects into the chamber 64. This projecting end of the valve supporting member is internally threaded as at 82 and said threaded portion terminates in a valve seat 83. A normally closed valve 84 such as a conventional automobile tire valve is removably mounted in the threaded portion 82 and seated against the seat 83 having the operating stem 84 projecting slightly above the end of the valve supporting member. The end plate 51 has an axially disposed threaded bore 85 extending therethrough in which the threaded stem 86 of a bushing 87 is mounted with the head 88 thereof clampingly engaging a sealing gasket 89 against the outer surface of the end plate 51. The bushing is interiorly threaded and tightly engages the interior threads of an adjusting screw 90 having an end 91 disposed in such proximity to the exposed end of the valve stem 84 that a slight pressure induced movement of the diaphragm unit toward the screw end 91 will cause the valve to be opened to permit the flow of compressed air from the chamber 63 into the chamber 64.

As previously mentioned, the pressure responsive area of the chamber 64 is five times as great as the pressure responsive area of the chamber 63. Thus, assuming the imposition of a pressure of 200 p.s.i. in chamber 63, the diaphragm unit will move to open the valve 83 until such time as a pressure of 40 p.s.i. is established in the chamber 64 with resultant movement of the diaphragm unit to a position in which the valve stem is out of contact with the screw end 91 allowing the pressure in the chamber 64 and the spring of the valve to close it.

Referring to FIG. 2, it will be noted that the high pressure air is supplied through the pressure regulator 48 to the inlet port 65 through a line 92 with an interposed shutoff valve 93 and a branch line 94 leading to the proportioning unit 49. Additionally, the line 95 connects the line 92 with the manifold 37 there being a shutoff valve 96 interposed in said line 95 and a pressure gauge 97 connected upstream of the valve 96. The line 92 terminates in an open end normally closed by a shutoff valve 98 which can be employed to blow off pressure from the high pressure chamber of the proportioning unit 49 with the valves 93 and 96 closed. A line 99 extends between the delivery port 67 of the proportioning means 49 to the manifold 37 with a shutoff valve 100 interposed therein and a pressure gauge 101 connected upstream of said shutoff valve 100.

As previously mentioned, accurate pressure gauges for pressures which can be checked against manometers are available only for those lower pressures which can be thus accurately established. Thus, assuming that the regulator 48 is adjusted for approximately 200 p.s.i. and that valves 93, 96, 98 and 100 are closed, upon opening valve 93 pressure will enter the proportioning device 49 and, assuming that the screw 90 is properly adjusted, a pressure equal to one-fifth of the pressure received from the regulator 48 will be registered on the gauge 101 which is in communication with the chamber 64. If a pressure of 200 p.s.i. is desired in the manifold 37, the regulator 48 is adjusted until a pressure of 40 p.s.i. is registered on the gauge 101 since the proportioner operates on a 1:5 ratio, wherefore, it will be known that a pressure of 200 p.s.i. exists in the line 95. The gauge 97 can thus be checked and, in fact, calibrated against the pressures thus imposed on the gauge 101. The selected pressure or pressures can thus be introduced into the manifold 37 by opening either the valve 96 or the valve 100 and the one of the valves 42, 43, 44 or 45 to introduce the desired pressure into the desired space in the unit 1 after which, the said valves may be shut so that the various spaces or chambers in the unit are subjected to static pressures of desired magnitudes.

When a change is to be made, the valve 93 is closed and the blowoff valves 47, 98 and 103, or desired ones thereof are opened to restore the system or a portion thereof to atmospheric pressure and the blowoff valves again closed. Thus, extremely accurate, elastic pressure induced loads can be imposed on the test bar T2.

Referring finally to FIG. 6, there is shown diagrammatically a more complex unit than that disclosed in FIG. 2 in that a plurality of pressure proportioning devices like that above described but with different ratios, are connected in parallel between a source of compressed air and the manifold 37. By way of example, proportioning device 49 might have a 1:5 ratio, 49a a 1:10 ratio, and 49b a 1:20 ratio, thus giving a wide range of pressures which may thus be applied to the unit 1 through the selection of individual proportioning units and pressures derived therefrom.

While in the foregoing specification there has been described a presently preferred embodiment of the invention, the invention is not to be deemed to be limited to the precise details of construction thus disclosed by way of example, and it will be understood that the invention includes as well all such changes and modifications in the parts and in the construction, combination and arrangement of parts as shall come within the purview of the appended claims.

I claim:

1. In a means utilizing elastic fluid pressure to create predetermined magnitudes of force in a predetermined line of movement, an expansible chamber device comprising an enclosed, tubular body structure having the interior thereof divided into a plurality of generally concentrically disposed chambers separated from each other by a series of tubular bellows elements of progressively decreasing internal volume, and all of said bellows having one end thereof attached to a member constituting an end of said housing and having the other ends thereof closed by one each of plurality of plate-like end members having means establishing abutting relation with one another while maintaining said plate-like members spaced from each other, a first series of passages extending one each between adjacent ones of said chambers, pressure responsive valve means in each of said first series of passages operative to permit the flow of elastic fluid subjected to pressure from an outer chamber to the adjacent inner chamber to an extent establishing equal pressures in said adjacent chambers, a second series of passages extending one each between adjacent ones of said chambers, other pressure responsive valve means in each of said second series of passages operative to permit the flow of elastic fluid subjected to pressure from an inner to an adjacent outer one of said chambers only when the pressure in the said inner one of said adjacent chambers exceeds the pressure in the adjacent outer chamber by a predetermined extent, a source of pressure, a plurality of inlet ports and individually controlled valves therefor disposed one for each of said chambers operable to connect said chambers selectively with said source of pressure, means for selectively varying the pressure imposed by said source on the chamber connected thereto whereby increasing pressure can be introduced into each of said chambers disposed within another of said chambers within the limits imposed by said other pressure responsive valve means, and means carried by said body structure movable relative thereto and engaged by the outermost of said plate-like members effective to translate pressure introduced into said chambers into a force movable in a predetermined line of movement with respect to said body structure.

2. A force exerting means as claimed in claim 1 in which said passages and associated valve means are disposed in said plate-like members.

3. A force exerting means as claimed in claim 1 in which said ports are connected to a manifold, and in which said manifold is connected to said pressure source by means effective to introduce a selected one of a plurality of pressures into said manifold.

4. In a means utilizing elastic fluid pressure to create predetermined magnitudes of force in a predetermined line of movement, an expansible chamber device comprising an enclosed, tubular body structure having the interior thereof divided into a plurality of nested chambers of progressively decreased volume; said body structure including a first end member provided with a plurality of inlet ports through which elastic fluid under pressure may be separately introduced into each of said plurality of chambers, and the opposite end being closed by a second end member having an axially disposed opening extending therethrough, a rod-like force exerting element movable in the axial line of said body structure and having a portion thereof projecting through said opening, an expansible bellows having one end secured to a peripheral portion of said rod exteriorly of said body structure and the other end connected to said second end member of said body structure effective to preserve the integrity of the enclosure of said body structure while allowing said element to have reciprocable movement parallel to the axial line of said body structure; said means dividing the interior of said body structure into said plurality of chambers comprising a second generally cylindrical bellows, said bellows being of lesser axial length and lesser diameter that said body structure and being disposed generally concentrically within said body structure and having one end thereof attached to said first end member of said body structure and having a plate-like member attached to the other end of said bellows with resultant formation of a first chamber exteriorly of said bellows and plate-like member and a second member interiorly thereof, a first passage extending between said chambers and having a pressure responsive valve biased to allow pressure fluid entering said first chamber to enter said second chamber to an extent equalizing the pressure in said chamber, a second passage extending between said chambers and having a valve means therein biased to permit pressure fluid to pass therethrough from said second chamber to said first chamber only in the event of pressure in said second chamber of a predetermined magnitude greater than the pressure in said first chamber, means for selectively supplying elastic fluid under selected, predetermined pressures to each of said chambers through the ones of said ports associated therewith and abutment means on said plate-like member engaging the end of said force exerting element within said body structure.

5. A force exerting means as claimed in claim 4 in which said passages and associated valve means are located in said plate-like member.

6. A force exerting means as claimed in claim 4 in which said second chamber is divided into a plurality of concentric and axially spaced chambers by a plurality of concentrically disposed bellows of progressively less length than the bellows exteriorly thereof, each of said bellows being secured to said first end member of said body structure and each having the opposite end thereof closed by a plate-like end member and each of said plate-like members having abutting engagement with the plate-like member associated with the bellows disposed exteriorly thereof whereby force exerted by a pressure induced load on any one of said plate members will be communicated through the intervening plate members to said rod-like force exerting element, in which each of said chambers is connected to the chamber interiorly thereof with interposed valve means permitting the pressure from the exterior chamber to enter the interior chamber to an extent equal to the pressure in the interior chamber and in which each of said chambers is connected to the next chamber exterior thereof by a passage including a valve means operative to allow pressure to pass from the interior chamber to the next chamber exterior thereof only in the event of a pressure differential of a predetermined magnitude greater than the pressure in the exterior chamber.

7. A force exerting means as claimed in claim 4 in which said supply means includes a manifold having branch lines connected to each of said ports in said body structure, a shutoff valve disposed in each of said branch lines, and a plurality of supply lines adapted to supply elastic pressure fluid at selected different pressures to said manifold and valve means for selectively connecting said supply lines to said manifold.

8. A force exerting means as claimed in claim 6 in which all of said passages between said plurality of chambers and said valves associated with said passages are located in the plate members associated with the respective bellows components.

9. A force exerting means as claimed in claim 7 in which at least one of said supply lines includes a proportional pressure reducing means having an inlet port and an outlet port and means interposed between said ports effective to reduce the pressure of pressure fluid delivered from said outlet port to a predetermined fraction of the pressure of said pressure fluid entering said inlet port.

10. A force exerting means as claimed in claim 9 in which said pressure proportioning means includes a body structure having a high pressure chamber connected with said inlet port and having a diaphragm closing one end thereof and also having a low pressure chamber having a diaphragm forming a wall thereof adjacent to the diaphragm forming the wall of said high pressure chamber, means connecting said diaphragms together for movement in unison, a passage extending through said diaphragms and connecting means, a normally closed valve in said passage including a stem projecting into said low pressure chamber, a valve stem abutment in said low pressure chamber adapted to engage said valve stem to open said valve for passage of high pressure air in said low pressure chamber when the load on said low pressure diaphragm is less than the load on said high pressure diaphragm; the area of said high pressure diaphragm being a predetermined fraction of the area of said low pressure diaphragm whereby pressure fluid delivered from the exhaust port of said pressure proportioning device will always be a predetermined proportion of the pressure introduced into said high pressure chamber.

References Cited by the Examiner
UNITED STATES PATENTS
2,780,091   2/1957   Amen _____ 73—9

EDGAR W. GEOGHEGAN, *Primary Examiner.*